July 5, 1927. 1,635,126
B. JIROTKA
APPARATUS FOR DELIVERING MEASURED QUANTITIES OF A FLUENT MATERIAL
Filed May 27, 1926
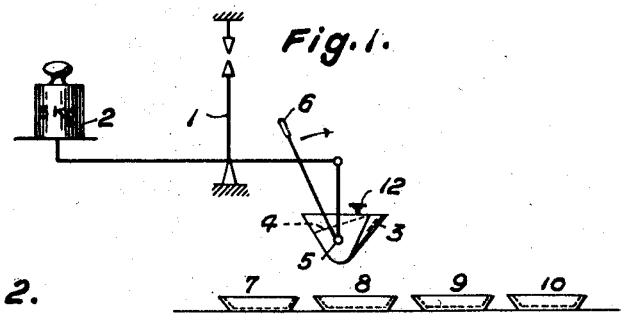
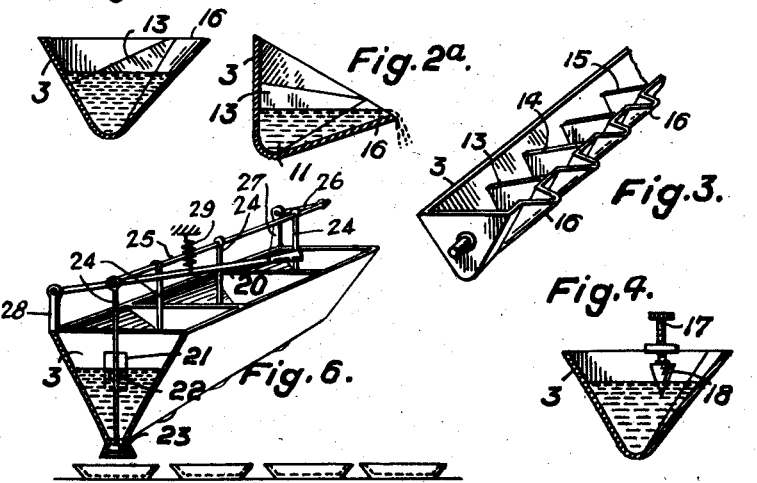
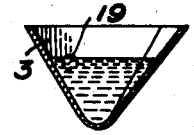
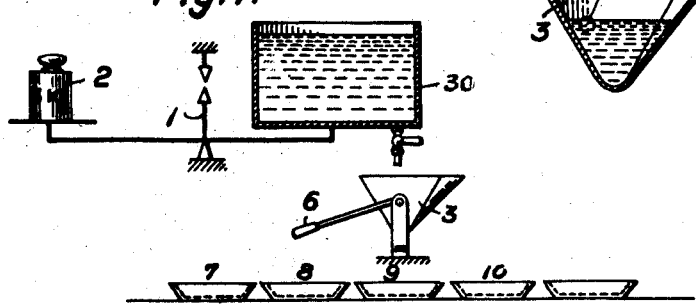

Patented July 5, 1927.

1,635,126

UNITED STATES PATENT OFFICE.

BOHUMIL JIROTKA, OF BERLIN, GERMANY, ASSIGNOR TO THE FIRM DR. OTTO SPRENGER, PATENTVERWERTUNG JIROTKA MIT BESCHRANKTER HAFTUNG, OF VADUZ, GERMANY.

APPARATUS FOR DELIVERING MEASURED QUANTITIES OF A FLUENT MATERIAL.

Application filed May 27, 1926, Serial No. 112,091, and in Germany December 29, 1923.

This invention relates to a method of and apparatus for delivering measured quantities of a fluent material and more particularly to a method of and apparatus for manufacturing plates or other articles from cocoanut fat, tallow, solid fat or the like, the object of the present invention being to enable the simultaneous production of any desired number of plates or like articles, all of the same weight, from such fats in the liquid or molten state, whilst permitting variation of the weight of the plates according to requirements.

According to this invention a filling and measuring vessel is provided with compartments into all of which the fluent material can simultaneously be filled or charged, whilst the fluent material is discharged separately from each compartment into moulds, in which the fluent material may harden into plates or other articles. The measuring vessel is divided into equal compartments, so that the articles manufactured are all of equal weight.

In order that the invention may be more clearly understood, reference is hereinafter made to the accompanying drawings which illustrate various examples of apparatus for carrying out the process according to the present invention.

Fig. 1 diagrammatically illustrates a weighing machine having a sub-divided receptacle according to this invention.

Fig. 2 is a vertical section through the liquid vessel to a larger scale and in upright position.

Fig. 2ª shows the vessel in cross section and in the position assumed when tilted.

Fig. 3 is a perspective view of a fragment of the vessel.

Fig. 4 illustrates in cross section a modification of the vessel fitted with a volume regulator.

Fig. 5 illustrates a further modification of the vessel in which the partitions are fitted with overflow apertures.

Fig. 6 illustrates a further modification of the apparatus in which the vessel is fitted with valve controlled overflow openings.

Fig. 7 illustrates a further modification in which the weighing machine is separate from the measuring vessel.

Referring to Fig. 1 of the drawings, the numeral 1 designates a conventional type of weighing machine having, for example, a weight 2 of 5 kilograms on the scale pan.

An elongated hopper or channel 3 forms the weighing receptacle of the weighing machine, being pivotally hung at 5 and adapted to be tilted by turning a lever 6. The moulds 7, 8, 9 and 10 are arranged below the hopper 3.

The modus operandi is as follows:—

As shown in Fig. 2, the liquid or fluent material 11 is charged into the hopper 3 whilst the latter is in the upright position shown in Fig. 2, the liquid being either poured into the hopper or delivered through suitable piping. The hopper 3 is provided with partitions 13, 14 and 15 which divide the hopper into equal compartments, each provided with a discharge spout 16. As shown in Figs. 2 and 2ª, the upper edge of the partitions 13 etc., are inclined so that when the hopper is in the upright position, the fluent material has access to all the compartments. The compartments are, however, separated from one another as illustrated in Fig. 2ª when the hopper is tilted to discharge the material from the spout 16.

If the hopper is provided, for example, with 10 compartments and 5 kilograms (or 5,000 grams) of liquid is charged into the hopper, the liquid will overflow from one compartment to another until 500 grams is contained in each compartment and as soon as the hopper is tilted through a small angle in the direction of the spout 16, as in Fig. 2ª, the level of the liquid will be intersected by the partitions 13 until the liquid is prevented from passing from one compartment to another. Thus each compartment will receive an equal volume of the liquid and on further tilting the hopper, the liquid may be discharged into the moulds 7, 8, 9 and 10, in which the fat may cool into the form of plates or other articles, according to the shape of the moulds.

Fig. 4 illustrates a device whereby any inaccuracies in the construction of the compartments can be regulated to produce compartments of exactly equal volume. In the illustration, a screw 17 is provided with a cone 18 which will increase or diminish the volume of the liquid in the compartment by turning the screw 17. Each compartment may be provided with a similar screw 17 and cone 18. With this arrangement the hoppers can be used for liquids of different specific gravity without otherwise varying the compartments.

Instead of employing partitions having an inclined upper edge, the partitions may be provided with overflow apertures 19 as in Fig. 5 or with valve controlled apertures.

Instead of constructing the weighing receptacle in the form of a long channel or elongated hopper, the liquid receptacle may be of any desired shape and the discharge of the contents may be effected by pressure or by levers instead of tilting the hopper as already described. For example, overflow openings may be closed and outlet valves opened by pressure as indicated in Fig. 6 in which the lever 20 is adapted to simultaneously control the whole of the slide valves 21 of overflow openings 22 and to simultaneously control the discharge valves 23. For this purpose the valves 23 are supported on rods 24, which are connected by a longitudinal rod 25. The longitudinal rod 25 is mounted at its two ends on levers 26, the lever at one end only being shown. The levers 26 are swingably mounted on supports 27. At the middle of the rod 25 a hand lever 20 is connected whose end is pivoted to a support 28. The lever is normally held in raised position by a spring 29. When the hand lever is depressed all the valve rods 24 which are connected by longitudinal rod 25 are moved down and open the outlet valves 23. At the same time all the slide valves 21 which are also connected to the rods 24 are closed.

As indicated in Fig. 7, the liquid measuring vessel 3 may also be separate from the weighing vessel 30 of the weighing machine, so that the liquid is first weighed out in the vessel 30 and then discharged into the measuring vessel 3.

I claim:

1. An apparatus for delivering a plurality of measured quantities of fluent material, comprising a vessel, partitions dividing said vessel into compartments, means of communication between said compartments operative when the vessel is filled for permitting the fluent material to seek a common level in all said compartments, and means for simultaneously closing said communication means and discharging the fluent material from all said compartments in separate streams.

2. In an apparatus for delivering a plurality of measured quantities of fluent material, a weighing device having a vessel for the reception of the material, partitions dividing said vessel into compartments, means of communication between said compartments operative when the vessel is filled for permitting the fluent material to seek a common level in all said compartments, and means for simultaneously closing said communication means and discharging the fluent material from all said compartments in separate streams.

3. An apparatus for delivering a plurality of measured quantities of fluent material, comprising a tiltable elongated channel, partitions dividing said channel into compartments, and communication means between said compartments permitting the material to flow from one compartment to another in the filling position of the channel, said communication means being raised above the surface of the material when the channel is tilted to discharge the same.

4. An apparatus for delivering a plurality of measured quantities of fluent material, comprising an elongated channel mounted so as to be tiltable to one side to discharge the material therefrom, partitions dividing said channel into compartments, the upper edges of said partitions being inclined downwardly from the discharge side of said channel in the filling position thereof, the lowest portions of said inclined edges permitting the material to flow from one compartment into another in the filling position of said channel, said edges being completely above the surface of the material in the discharging position of said channel.

5. An apparatus for delivering a plurality of measured quantities of fluent material, comprising an elongated channel mounted so as to be tiltable to one side to discharge the material therefrom, partitions dividing said channel into compartments, said partitions having apertures permitting the flow of material from one compartment to another in the filling position of the channel, said apertures being above the surface of the material in the discharging position of the channel.

6. An apparatus in accordance with claim 1 in combination with means for regulating the volume of each compartment.

7. An apparatus in accordance with claim 1 in combination with means for regulating the volume of each compartment, comprising an adjustably mounted body adapted to be lowered into the space occupied by the material.

In testimony whereof I affix my signature.

BOHUMIL JIROTKA.